Sept. 6, 1932.  H. ARNI  1,876,442
DEVICE FOR COPYING FILMS
Filed Feb. 17, 1932
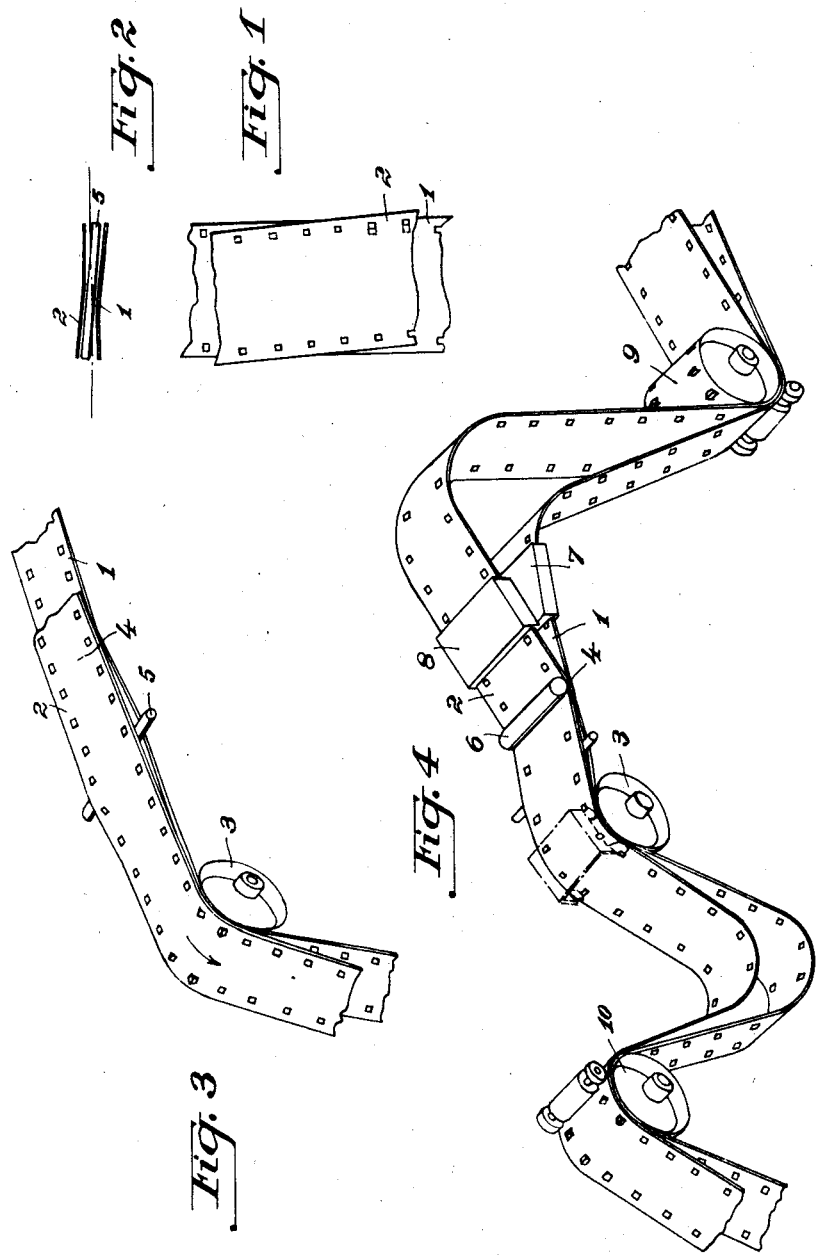

Patented Sept. 6, 1932

1,876,442

UNITED STATES PATENT OFFICE

HANS ARNI, OF FALKENSEE, NEAR BERLIN, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

DEVICE FOR COPYING FILMS

Application filed February 17, 1932, Serial No. 593,515, and in Germany December 6, 1930.

My invention relates to devices for copying films.

On copying lenticulated films well-known watered effects are observed, if the copying process is performed in such a manner that the films are in contact with one another at the point of exposure, so that the intensity of the light passing through the films is altering from one spot to the other and gives rise to stripes on the copy. It has been suggested to avoid this by placing the films one upon the other in such a manner that the directions of the embossments form a small angle with one another at the point of exposure. The watered effects are thereby made to travel and the mean intensity of the light is equal at all points. The invention relates to a device for carrying out this copying process.

According to the invention the apparatus for copying films is so designed as to provide, between the exposure gate and the feeding devices for both the exposed film and the unexposed film, a device for causing the two films to be disposed at a slight angle to each other at the gate. This device does not affect the feed of the films, but causes one film or both films to be bent outwards at one edge, so as to enable the films to come into contact at the point of exposure exactly at the prescribed angle.

Lenticulated films, in particular, are copied in such a manner. The new device permits of reliably eliminating the difficulties encountered on copying films fed in paths having an angle therebetween, in which case it is not possible to secure an accurate running of the films without using special auxiliaries.

The device covered by this application, causing one film or both films to be kinked or bent outwards, permits of using feeding devices having a common shaft or shafts lying parallel to one another. In order to increase the security with respect to mutual displacements, care should be taken to pass both films through the same feeding device and to rack the films between the point of exposure and the feeding device. They can also be bent outwards by means of a small rod inserted between the films at a given angle.

A selected embodiment of the new device is shown in the figures.

Fig. 1 is a fragmentary view of the two films, showing their relation to each other adjacent the gate, this relation being exaggerated for the sake of clearness.

Fig. 2 is a transverse section through the two films taken adjacent the novel device referred to above.

Figs. 3 and 4 are diagrammatic perspective views of the two films and the apparatus for acting thereon according to this invention.

Fig. 1 is a plan view of the two films at the point to be exposed. The longitudinal directions of the films 1 and 2 form at this point a small angle with one another which is about 1°. In order to obtain this angle in a reliable manner, as is shown in Fig. 3, provision is made, before the feed wheel 3 serving for moving the films in the direction of the arrow, for a small rod 5, which is so arranged that it forms a certain angle with the shaft of the feed wheel 3. This rod acts in a manner shown in Fig. 2. The two films are bent outwards slightly at opposite edges and thus displaced from the plane indicated in the drawing and running parallel to the shaft of the wheel 3, which plane may be defined as one parallel to the normal planes of the films at the gate. It results therefrom that, at the gate of exposure 4 before the rod, the films are in contact with one another at the desired small angle, the trouble of slipping with respect to each other being avoided, as they are run with complete accuracy under the action of the common feed wheel 3.

It is of advantage to provide two further guiding devices for the films which cause the films to be run stretched through the copying device. Such a device has been represented in Fig. 4 as a constructional example. At the point of exposure, there is in this case a roller 6, designed to press the films one upon another. The exposure is achieved from below. This method of exposing should always be chosen, since the exposed film lying below has shrunk up owing to the treatment by developing and fixing agents and, as the first on the feed wheel 3, has the smaller radius of curvature. The roller is preceded by two guiding devices 7 and 8 which permit the film strips to run in a tightly stretched condition over the point 4 where they are exposed to light. At the input and output of the copying device, provision is, in addition, made for the feed wheels 9 and 10.

As for the rest, the films are exposed, in a manner well-known in the art, care must, however, be taken that the height of the gate of exposure is in accordance with the angle formed by the quotient of the width of the embossment and the sine of the angle formed by the two embossments.

I claim as my invention:

1. In a device for copying one lenticulated film from another, means for feeding said films past an exposure aperture, and means for kinking at least one of the films with respect to the other and at least in part out of its normal plane sufficiently to displace one film laterally with respect to the other and thereby to introduce a slight angle between the longitudinal axes of the films at the exposure aperture.

2. In a device for copying one lenticulated film from another, means for feeding said films past an exposure aperture, means on opposite sides of said aperture to maintain said films parallel to each other, and means disposed between said last-named means and adapted to introduce a kink in at least one of the films out of its normal plane sufficiently to displace one film laterally with respect to the other and thereby to introduce a slight angle between the longitudinal axes of the films at the exposure aperture.

3. In a device for copying one lenticulated film from another, means for feeding said films past an exposure aperture, means on opposite sides of said aperture to maintain said films parallel to each other, and means disposed between said last-named means and adapted to displace at least one of said films at least in part from its normal plane a distance sufficient to displace one film laterally with respect to the other and thereby to introduce a slight angle between the longitudinal axes of the films at the exposure aperture.

4. In a device for copying one lenticulated film from another, means for feeding said films past an exposure aperture, means on opposite sides of said aperture to maintain said films parallel to each other, and a rod disposed between said films between said last-named means and so arranged as to contact with both films and to displace at least one of them from its normal plane sufficiently to displace one film laterally with respect to the other and thereby to introduce a slight angle between the longitudinal axes of the films at the exposure aperture.

5. In a device for copying one lenticulated film from another, means for feeding said films past an exposure aperture, means on opposite sides of said aperture to maintain said films parallel to each other, and a rod disposed between said films between said last-named means and out of a plane parallel to the normal planes of the films and thereby displacing at least part of at least one film from its normal plane sufficiently to displace one film laterally with respect to the other and thereby to introduce a slight angle between the longitudinal axes of the films at the exposure aperture.

6. In a device for copying one lenticulated film from another, means for feeding said films past an exposure aperture, means on opposite sides of said aperture to maintain said films parallel to each other, and a rod disposed between said films between said last-named means and out of a plane parallel to the normal planes of the films and bending opposite edge portions of the two films sufficiently to displace one film laterally with respect to the other and thereby to introduce a slight angle between the longitudinal axes of the films at the exposure aperture.

7. In a device for copying one lenticulated film from another, means for feeding said films past an exposure aperture, and means for displacing one edge portion of one of the films out of its normal plane and away from the other film sufficiently to displace one film laterally with respect to the other and thereby to introduce a slight angle between the longitudinal axes of the films at the exposure aperture.

8. In a device for copying one lenticulated film from another, means for feeding said films past an exposure aperture, and means for displacing one edge portion of one of the films out of its normal plane and away from the other film and for displacing the opposite edge portion of the other film out of its normal plane and away from the first-named film sufficiently to displace one film laterally with respect to the other and thereby to introduce a slight angle between the longitudinal axes of the films at the exposure aperture.

In testimony whereof I affix my signature.

HANS ARNI.